(12) United States Patent
Gadish et al.

(10) Patent No.: US 10,387,279 B2
(45) Date of Patent: *Aug. 20, 2019

(54) SYSTEM AND METHOD FOR PROVIDING FAILOVERS FOR A CLOUD-BASED COMPUTING ENVIRONMENT

(71) Applicant: Amazon Technologies, Inc., Seattle, WA (US)

(72) Inventors: Ofer Gadish, Rishon LeZion (IL); Leonid Feinberg, Tel-Aviv (IL); Ofir Ehrlich, Netanya (IL); Gil Shai, Ramat Gan (IL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/433,640

(22) Filed: Feb. 15, 2017

(65) Prior Publication Data

US 2017/0161163 A1     Jun. 8, 2017

Related U.S. Application Data

(63) Continuation of application No. 14/205,083, filed on Mar. 11, 2014, now Pat. No. 9,582,386.

(60) Provisional application No. 61/787,178, filed on Mar. 15, 2013.

(51) Int. Cl.
*G06F 11/20* (2006.01)
*G06F 11/14* (2006.01)
*H04L 29/08* (2006.01)

(52) U.S. Cl.
CPC ...... *G06F 11/2094* (2013.01); *G06F 11/1482* (2013.01); *G06F 11/2097* (2013.01); *G06F 2201/85* (2013.01); *H04L 67/10* (2013.01)

(58) Field of Classification Search
None
See application file for complete search history.

(56) References Cited

U.S. PATENT DOCUMENTS

| 5,708,776 | A | 1/1998 | Kikinis |
| 6,202,091 | B1 | 3/2001 | Godse |
| 6,485,707 | B2 | 11/2002 | Zhu et al. |
| 6,601,167 | B1 | 7/2003 | Gibson et al. |
| 6,754,855 | B1 | 6/2004 | Denninghoff et al. |

(Continued)

FOREIGN PATENT DOCUMENTS

CN      103095759 A     5/2013

*Primary Examiner* — Belix M Ortiz Ditren
(74) *Attorney, Agent, or Firm* — Nicholson De Vos Webster & Elliott, LLP (57) ABSTRACT

A method and system for providing failovers for a primary cloud-based computing environment (CBCE) residing in a first cloud environment. The method includes gathering information with respect to the primary CBCE; storing the gathered information in a storage space; updating the stored information based on at least one change with respect to the primary CBCE; determining, based on at least one status received from the primary CBCE, whether a failover is required for the primary CBCE; and initiating a reconstruction of the primary CBCE in a second cloud environment, when it is determined that a failover is required for the primary CBCE, wherein the reconstruction of the CBCE is based on the stored information.

19 Claims, 3 Drawing Sheets

(56) References Cited

U.S. PATENT DOCUMENTS

| | | |
|---|---|---|
| 6,845,464 B2 | 1/2005 | Gold |
| 6,948,099 B1 | 9/2005 | Tallam |
| 7,024,581 B1 | 4/2006 | Wang et al. |
| 7,409,584 B2 | 8/2008 | Denninghoff et al. |
| 7,769,990 B1 | 8/2010 | Okcu et al. |
| 8,122,282 B2 * | 2/2012 | Betzler ............... G06F 11/1438 714/25 |
| 8,301,600 B1 | 10/2012 | Helmick et al. |
| 8,417,938 B1 * | 4/2013 | Considine ............ G06F 9/5088 713/151 |
| 8,468,138 B1 | 6/2013 | Chhaunker et al. |
| 8,712,968 B1 | 4/2014 | Chester et al. |
| 8,799,413 B2 * | 8/2014 | Taylor ............... G06F 17/30215 709/219 |
| 9,740,564 B2 | 8/2017 | Kumagai |
| 2002/0023225 A1 | 2/2002 | Lomnes |
| 2002/0055991 A1 | 5/2002 | Arrouye et al. |
| 2004/0098426 A1 | 5/2004 | Ishii et al. |
| 2004/0123188 A1 | 6/2004 | Srinivasan et al. |
| 2007/0055853 A1 | 3/2007 | Hatasaki et al. |
| 2007/0220304 A1 | 9/2007 | Slater et al. |
| 2008/0016387 A1 | 1/2008 | Bensinger |
| 2008/0133963 A1 | 6/2008 | Katano et al. |
| 2008/0276123 A1 | 11/2008 | Sudhakar et al. |
| 2010/0031079 A1 | 2/2010 | Gupta et al. |
| 2010/0223610 A1 | 9/2010 | DeHaan et al. |
| 2010/0257142 A1 | 10/2010 | Murphy et al. |
| 2011/0107165 A1 | 5/2011 | Resch et al. |
| 2011/0252001 A1 | 10/2011 | Bensinger |
| 2012/0054477 A1 | 3/2012 | Lubars |
| 2012/0078855 A1 | 3/2012 | Beatty et al. |
| 2012/0084355 A1 | 4/2012 | Locker et al. |
| 2012/0151257 A1 | 6/2012 | Tam |
| 2012/0278283 A1 | 11/2012 | Hildebrand et al. |
| 2013/0268561 A1 | 10/2013 | Christie et al. |
| 2013/0326260 A1 | 12/2013 | Wei et al. |
| 2014/0195848 A1 | 7/2014 | Teli et al. |
| 2014/0279915 A1 | 9/2014 | Gadish et al. |
| 2015/0149412 A1 | 5/2015 | Kobres |
| 2015/0301880 A1 | 10/2015 | Allu et al. |
| 2016/0239396 A1 | 8/2016 | Deng et al. |
| 2016/0267275 A1 | 9/2016 | Gschwind |
| 2016/0283281 A1 | 9/2016 | Antony |
| 2016/0364252 A1 | 12/2016 | Graf et al. |

* cited by examiner

SYSTEM AND METHOD FOR PROVIDING FAILOVERS FOR A CLOUD-BASED COMPUTING ENVIRONMENT

CROSS-REFERENCE TO RELATED APPLICATIONS

This patent application is a continuation of U.S. patent application Ser. No. 14/205,083 filed on Mar. 11, 2014, now allowed, which claims the benefit of U.S. provisional patent application No. 61/787,178 filed on Mar. 15, 2013. The contents of the above-mentioned applications are hereby incorporated by reference.

TECHNICAL FIELD

The invention generally relates to computing environments implemented in the cloud, and more particularly to backup and restoration techniques for computing environments in the cloud.

BACKGROUND

In recent years more and more providers have begun providing the ability to create computing environments in the cloud. For example, Amazon Web Services™ (also known as AWS) launched in 2006 a service that provides users with the ability to configure an entire environment tailored to an application executed over the cloud platform. In general, such services allow developing scalable applications in which computing resources are utilized to support efficient execution of the application. To this end, a programmer (a user of the cloud-computing environments) can define the computing resources, such as servers, web servers, routers, storage, load balancers, firewalls, backup, and connectivity as may be desired. Services for creating computing environments in the cloud allow dynamic changes to the set of computing resources and their configurations. This may include adding components or removing components from the configured environment as may be necessary, as well as changes to other configurations of the environment and changes to the configuration of each component.

Organizations and businesses that develop, provide, or otherwise maintain cloud based applications have become accustomed to relying on these services and implementing various types of environments from complex web sites to data mining systems and much more. However, there is a challenge as greater reliance is made on such systems, since such systems have to maintain a very high up-time and any failure may become highly problematic and/or costly to a user of the system. That is, there is a requirement to allow for business continuity. For example, for an e-commerce application executed in a cloud-based environment, any down time of such application means revenue lost. As a result, providers of such applications often utilize measures to ensure continuity of operations by backing up information that is relevant to maintaining operations.

While the providers of such cloud-based environments provide various backup capabilities that automatically or semi-automatically store data from one computer in another storage space that is separate from the computer, those providers still rely on the user to address these issues effectively. Therefore, in order to ensure continuous operations of the application, mirror or backup environments are manually created by the application developer or application owner. In addition, any changes made to the primary environment must be manually updated in the backup environment.

For example, when a machine allocated in the cloud-environment for execution of the application includes certain firewall configuration parameters, these parameters have to be copied manually to the respective backup machine if the user or provider desires that such parameters be identical in character to those of the backed-up machine. Additionally, while coherency maintenance between machines (such as physical and/or virtual machines) is well within the realm of existing solutions, cloud service providers do not currently support coherency maintenance for other computing resources such as load balancers. A solution that periodically backs up data of a machine by way of taking a snapshot and storing such data would be desired. This solution would enable reconstruction of the data in case of failure or when otherwise needed.

Therefore, the disadvantages of prior art solutions are quite obvious. At all times, it is necessary to maintain a full copy of the cloud-based computing environment (CBCE). That is, both machines and services, in at least another cloud environment or platform.

It would be therefore advantageous to provide an efficient solution for maintaining the ability to create a redundant CBCE in case of a failure of a primary CBCE.

SUMMARY

Certain embodiments disclosed herein include a system and method for securing continued operation of a primary cloud-based computing environment (CBCE) residing in a first cloud environment. The method comprises gathering information respective of the primary CBCE; storing the gathered information in a storage space, wherein the gathered information substantially provides a baseline to initiate the creation of a reconstructed CBCE upon a need to recreate the primary CBCE; updating the gathered information with new information gathered respective of changes to the primary CBCE; receiving a periodic status notification from the primary CBCE; and initiating a reconstruction of the primary CBCE in the second cloud environment responsive to the status notification requesting one of: a reconstruction request and failure of the primary CBCE.

BRIEF DESCRIPTION OF THE DRAWINGS

The subject matter disclosed herein is particularly pointed out and distinctly claimed in the claims at the conclusion of the specification. The foregoing and other objects, features and advantages of the invention will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claims. Moreover, some statements may apply to some inventive features but not to others. In general, unless otherwise indicated, singular elements may be in plural and vice versa with no loss of generality. In the drawings, like numerals refer to like parts through several views.

Certain embodiments disclosed herein include a system for maintaining a copy of a cloud-based computing environment (CBCE) and restoration thereof. The disclosed system and embodiments may provide an efficient and cost-effective solution for business continuity of a defined CBCE. Information respective of the CBCE is maintained by accessing and analyzing the CBCE, and storing baseline data respective of the CBCE. Thereafter, the system is continuously monitored for changes, and any changes to data and/or configuration are captured and stored. Upon determination of a failure of the primary CBCE, the resources and the configuration of such CBCE are replicated to a secondary CBCE using the stored baseline and any changes made thereon. The secondary CBCE may be in the same or another cloud platform as the primary CBCE.

Figure 1:
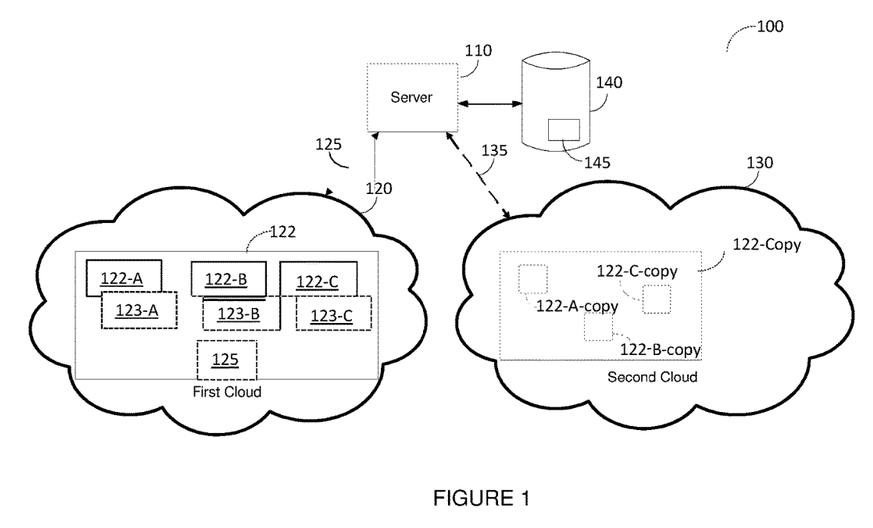
FIG. 1 is a schematic diagram of a cloud computing architecture utilized to describe the disclosed embodiments.

FIG. 1 is an exemplary and non-limiting diagram of a cloud computing architecture 100 utilized to describe the various embodiments disclosed herein. The cloud computing architecture 100 in the exemplary FIG. 1 includes two cloud infrastructures ("clouds") 120 and 130. Each of cloud infrastructures 120 and 130 may be a private cloud, a public cloud, or a hybrid cloud providing computing resources to applications or services executed therein.

A primary CBCE 122 is created and defined in the cloud 120 to execute a cloud-based application. As noted above, such application may include, among other things, an e-commerce application, a social media application, an enterprise application, a gaming application, a media sharing application, and so on. To support the execution of the cloud-based application the CBCE 122 is configured with various computing components or resources 122-A, 122-B and 122-C, each of which can be a machine or a service.

A machine of a computing component is a general purpose virtual machine capable of running an operating system and applications. A service of a computing component is a cloud-based functionality controllable by a user interface or one or more application programming interfaces (APIs). Examples of machines of computing components are web servers, database servers, cache servers, storage servers, virtual appliances, and the like. Examples of services of computing components are network architecture management services, load balancing services, auto scaling services, content delivery network (CDN) services, network addresses allocation services, database services and domain name system (DNS) services, and the like. Each such computing component or resource 122-A typically contains its own data and a set of configurations.

The CBCE 122 as a whole also has its own set of configurations, which includes various aspects that define the operation of the CBCE 122 in the cloud 120. The set of configurations of the CBCE 122 further extends beyond the specific components also to configure the desired operation modes, inter-machine dependencies, firewall settings, available services definitions as well as many other parameters required for the operation of the CBCE 122 in the cloud environment 120 in order to support efficient execution of the cloud-based application. For the sake of simplicity and without limiting the scope of the claimed embodiments, the CBCE 122 is the primary environment for execution of the cloud-based application. In an embodiment, the cloud-based application is configured with the restoration services provided by the disclosed embodiments. The cloud-based application may belong to an organization subscribed to such services. It should be noted that the CBCE 122 may be configured to execute a plurality of cloud-based applications, each of which may be configured with the restoration services disclosed herein.

The system 100 further includes a server 110 that is communicatively connected using an Internet connection 125 to the CBCE 122. The connection 125 may be a secured connection. In an embodiment, the server 110 is part of the cloud 120, the cloud 130, or in a network (not shown) of the owner or otherwise developer of the cloud-based application.

According to the disclosed embodiments, the server 110 is configured to manage, monitor, and gather information that enables restoration of the CBCE upon detection of a failure. The server 110 is communicatively connected to a storage device 140 and configured to maintain information respective of the CBCE 122 in the cloud 120 in the storage space 145 of a storage device 140. That is, the server 110 maintains the data and configurations of components 122-A, 122-B, and 122-C in the CBCE 122. In addition, the configuration information of the CBCE 122 is kept in the storage space 145.

In one embodiment, a plurality of monitoring agents, e.g., monitoring agents 123-A, 123-B, and 123-C, are installed in the primary CBCE 122. The monitoring agents 123-A, 123-B, and 123-C are configured to monitor for changes in data and configuration of the components 120-A, 120-B, and 120-C. Collectively or alternatively, another monitoring agent 125 is installed in the CBCE to detect changes in the data and configuration for the entire CBCE 122 and/or any or all of the machines therein. Moreover, any monitoring agent may be further configured to monitor services of the CBCE 120 through monitoring of the service's APIs. In an embodiment, when a copy of the primary CBCE 122 is created in the second cloud, the monitoring agents 123-A, 123-B, 123-C and 125 are included in the CBCE 122-Copy.

The information in the storage space 145 is maintained for the purpose of replicating, either identically or substantially identically, the CBCE 122 in case such is required, for example, in the case of a failure. The server 110 is further configured to maintain in the storage space 145 any information pertaining to any changes made to the components (both data and configuration) and the configuration of the CBCE 122 which may also include information about computing components addition to and removal from the CBCE 122, as well as other information for restoring or substantially restoring the CBCE 122. Specifically, all information that is necessary to recreate in a cloud, e.g., the cloud 130, including but not limited to, information for running a secondary CBCE 122-Copy, which functions as, or at least substantially as, the primary CBCE 122. A failover to the secondary CBCE 122-C may occur, for example, in the case of a failure of the CBCE 122, the cloud 120, or both. A trigger for the failover event may be an unresponsive or un-operational cloud-based application or a request from a user (e.g., an IT administrator). It should be understood that the CBCE 122-copy is created only upon such a trigger and is created based on the information gathered. At such time that CBCE 122-Copy becomes operative, the primary CBCE ceases operation and is typically released.

Upon a trigger of a failover event (as detailed above), the server 110 is configured to establish a communication link 135 to the cloud 130. It should be noted that the server 110 is at liberty to select any one of a plurality of clouds available at the time of failure, for example in the cloud 130, or any other available cloud infrastructure that can support a copy of the CBCE 122. It should be further noted that the CBCE 122-Copy can be created or instantiated in the cloud 120 on physical resources different than the physical resources allocated for the primary CBCE 122.

In an embodiment, the server 110 is configured to set a copy CBCE 122-Copy respective of the data and configuration stored in the storage space 145 about the primary CBCE 122, its computing components 122-A-copy, 122-B-copy, and 122-C-copy, and respective information. Once the restoring of the primary CBCE 122 as the secondary CBCE 122-Copy is complete, the CBCE 122-Copy begins operating in its target cloud (e.g., cloud 130).

In one embodiment, the server 110 and the storage space 145 can be used to monitor the copy CBCE 122-Copy so that it may be possible to replicate it in case of failure or in response to an indication of a desire to resume operation in the first cloud environment 120 once the reason for failure has been resolved. In one embodiment, such a transfer back to the cloud 120 is performed either responsive to a command from a user or responsive to an automatic detection. At such time, the CBCE 122-Copy may be deactivated and the server 110 will resume monitoring of the CBCE 122 as explained herein above. The server 110 comprises a processing unit (not shown) coupled to a memory (not shown) containing instructions that, when executed by the processing unit, perform the processes described herein. The server 110 further comprises at least a network interface to allow communication to and from the server 110 as further discussed herein.

In one embodiment, the user (e.g., an IT administrator) responsible for maintaining the cloud-based application configures the server 110 with credentials to access the primary CBCE 122 and its components and respective information. Using the credentials, the server 110 is configured to create an initial baseline of information respective of the primary CBCE 122, to ensure accurate backup and timely failover according to the disclosed embodiments.

This initial baseline information is stored in the storage space 145 as explained herein, and therefrom updated with any changes to components, respective data, and/or configuration of the primary CBCE 122 without creating a copy environment until such time that such a copy environment becomes necessary. For example, disks may be copied for their data content to the storage space 145, or changes thereto such as, for example, write operations to disks. Information respective of the write operations may further comprise the likes of: timestamp, offset, content, and length of written data. This provides a significant cost savings, as the proper replication or copy of service components only occurs when restoration of such components becomes necessary rather than requiring storage of replications of every component at any given time. It should be appreciated that a service computing component, such as a network architecture management service, a load balancing service, an auto scaling service, a content delivery network (CDN) service, a network addresses allocation service, a database service, and a domain name system (DNS) service cannot be merely replicated on-the fly upon a detection of a failure.

It should be noted that the cloud 120 may comprise a plurality of clouds, wherein each contains one or more elements of the primary CBCE. Similarly, the cloud 130 may comprise a plurality of clouds, each containing one or more elements of the secondary (restored) CBCE 122-Copy.

Figure 2:
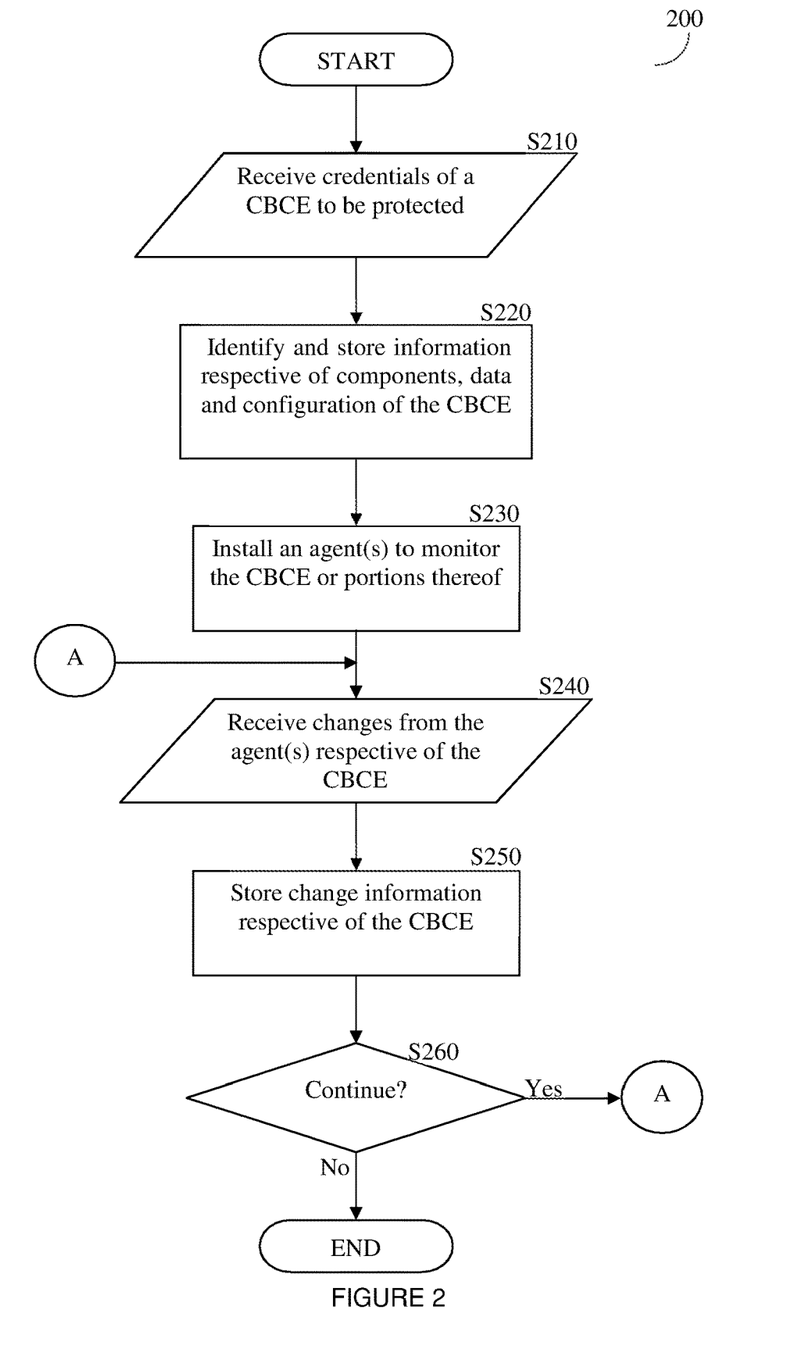
FIG. 2 is a flowchart of a method for monitoring a primary cloud-based computing environment according to one embodiment.

FIG. 2 depicts an exemplary and non-limiting flowchart 200 of a method of monitoring of a primary CBCE according to an embodiment. The primary CBCE (e.g., CBCE 122) executes or hosts at least one cloud-based application, wherein continuity execution of such application may be critical. In an embodiment, the method is performed by the server 110 using the storage device 140 discussed above.

In S210, credentials of the primary CBCE are received to allow access to the CBCE 122. In S220, an automated identification process of computing components, data, and configuration of the primary CBCE takes place and baseline information respective thereto is stored, for example, in the storage space 145. In an embodiment, a user (e.g., an IT administrator) may provide such baseline information as an input.

In S230, monitoring agents are installed in the primary CBCE that monitor for changes in the computing components, data, and configuration of the primary CBCE. As noted above, an agent may be installed for the entire CBCE and/or any or all of the machines therein. Moreover, an agent may also monitor services of the CBCE through monitoring of the service's APIs. In addition, some of the monitoring functions can be performed by a server that is not part of the primary CBCE, for example the server 110. The operation of the monitoring step is further discussed below.

In S240, changes respective of the primary CBCE are received by the server 110 (in push or pull mode of operation). In S250, received changes are stored in the storage space (e.g., storage space 145) respective of the baseline information of the primary CBCE. In S260, it is checked whether the process is desired to continue and, if so, execution continues with S240; otherwise, execution terminates.

Figure 3:
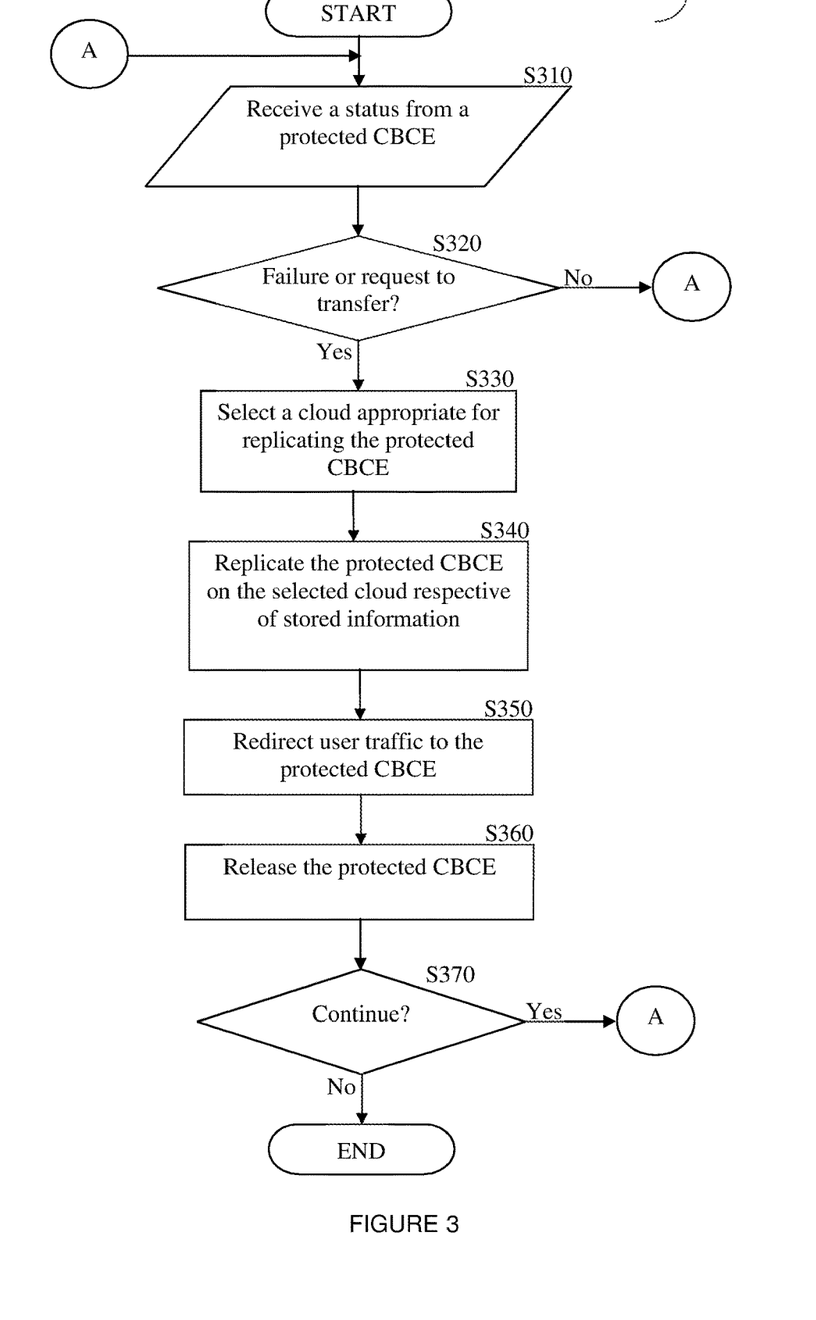
FIG. 3 is a flowchart of a method for creating a cloud-based copy of a cloud computing environment based on information gathered from the cloud computing environment according to one embodiment.

FIG. 3 shows an exemplary and non-limiting flowchart 300 of a method for performing a failover operation of a primary CBCE according to an embodiment. For the sake of simplicity and without limiting the scope of the disclosed embodiments, the primary CBCE (e.g., CBCE 122) is maintained in a first cloud and the secondary (restored) CBCE is maintained in a second cloud. In an embodiment, the method is performed by the server 110 using the storage device 140 as discussed above.

In S310, a status with regard to the functioning or operation of the primary CBCE is received. Such status can be received either in a pull or push mode of operation from the primary CBCE. The status received from the CBCE may provide an indication that the cloud-based application is unresponsive, that a machine and/or a service has failed, that a network malfunction has occurred, and the like.

In S320, it is checked whether the status requires a transfer of the operation from a first cloud to a second cloud, that is, if a failover should take place. In an embodiment, a determination is made if the received status requires a failover based on the nature of the reported status or its severity. In an embodiment, the server 110 may be configured with a list of status codes that trigger a failover operation. If S320 results with a Yes answer, execution continues with S330; otherwise, execution continues with S310. The failover operation is performed using the information stored in a storage space, for example, storage space 145.

In S330, a second cloud is selected in which to replicate the primary CBCE. Selection of the second cloud may be based on, e.g., a user's preference, size of available data in existing clouds, and so on. In S340, the primary CBCE is replicated or substantially replicated to the second cloud, which means that all components forming the CBCE, its configuration, and data are provided in the copy CBCE. The primary CBCE is replicated, as a copy CBCE, for example, copy CBCE 122-Copy, based on the information respective of the primary CBCE in the storage space. In an embodiment, S340 further includes the instantiation of machines and services in the second cloud based on the replicated information. That is, upon completion of S340, the second cloud would include environment that can support the execution of cloud-based applications based on the provisions set in the primary CBCE.

Optionally, in S350, user traffic is redirected from the primary CBCE to the second CBCE. As an example, user traffic may be redirected by changing DNS mapping, using HTTP redirects, or using a forwarding device. In optional step S360, the primary CBCE is released, for example, for the purpose of reducing utilization of cloud-based resources. In optional step S370, it is checked whether continuation is desired and, if so, execution continues with S310; otherwise, execution terminates.

It should be understood that the embodiments disclosed herein are not limited to the specific architectures discussed herein and other architectures may be used without departing from the scope of the embodiments. Specifically, server 110 may reside in the cloud 120, cloud 130, or any other location (cloud or otherwise) (not shown) connectable to the CBCE 122, may be on-premises at a user's site, or may be implemented virtually in a distributed "server-less" fashion. Moreover, in one embodiment, there may be a plurality of servers 110 operating as described hereinabove and configured to either operate with one server being a standby server to take control in a case of failure, or to share the load between them, or to split the functions between different types of servers.

In yet another embodiment, a first portion of a CBCE, for example a first portion of CBCE 122, may be restored in a first cloud environment while a second portion is being restored in a second cloud environment, and further while the server 110 is being configured to enable a configuration that allows the operation of the split copy CBCE as the primary CBCE functioned while operative. Moreover, in yet another embodiment, only a partial copy of the CBCE 122 is restored and either linked to the master CBCE to operate jointly, or to operate independently.

According to certain exemplary embodiments, a user may provide their credentials for accessing a CBCE. Accordingly, in such embodiments, a user adds one or more of the computing components in the CBCE to the list of components that should be monitored. The user optionally marks which cloud(s) and/or cloud region(s) to use when activating a copy of each primary component, different sets of primary components, or the entire CBCE. Then, the configuration of the CBCE and each of such components are read and stored in storage 140 and are monitored for changes.

One of ordinary skill in the art should readily appreciate that no running or idle mirror machine is created at the stage of replication or copy, thereby providing for a significant reduction in resource utilization. In addition, the automatic copy and continuous update of all or a significant part of the configuration saves much labor in comparison to manual configuration and maintenance of the replicated CBCE and the configuration. If an error occurs during the replication or copy process such as, but not limited to, a reboot of a machine, a disconnect of a traced disk, network failures, etc., a synchronization process is invoked when the error terminates to synchronize the data maintained by server 110 with the data of the monitored CBCE 122 and continue the replication or copy process described above.

When at least one component has an activated copy running in the cloud 130, the following takes place: the monitoring activities for the component(s) that has a copy activated may be stopped; and each component 122-A-copy through 122-C-copy and CBCE 122-Copy can be activated with the latest data of the corresponding primary CBCE 122 and components thereof, or with the data as it was at a specific time in the past. It is possible to activate the copy CBCE and components thereof using the state of all or some of the primary CBCE and components thereof in exactly the same point in time (e.g., for consistency groups' support). External references, which are not a part of the CBCE 120 (for example the DNS addresses of a site on an external DNS server) are optionally updated (automatically or manually).

In one embodiment, it can be automatically detected when one or more components, one or more CBCEs, or any combination thereof can be put back to normal mode (i.e., a mode in which the primary CBCE and its primary components resume operation and the second CBCE and/or its second components cease functioning). Detection can also be performed manually, followed by an instruction to begin the return of the component(s), the CBCE(s) or the combination(s) thereof to normal mode. The primary component(s), primary CBCE(s) or combination(s) thereof are synchronized with their respective copies, so that all the changes made on the copy component(s) in copy CBCE 130 (including, but not limited to, information on their disks and the component configurations), CBCE(s) or combination(s) thereof will be applied to their primary counterparts. These steps may be performed while the copy CBCE or its respective components are active.

In accordance with an embodiment, it is possible to achieve a replication of a primary CBCE without continuously having to operate a secondary CBCE by performing the method described in more detail above (i.e., the method described in FIG. 2) on the copy component(s) of the copy CBCE, copy CBCE(s) or combination(s) thereof, followed by performing the method described in more detail above (i.e., the method described in FIG. 3) on the primary component(s), primary CBCE(s) or combination(s) thereof.

In another embodiment, a return to normal mode can be performed on demand, when leaving copy mode. Thus, all changes performed on the copy component(s) of the copy CBCE, copy CBCE(s) and combination(s) thereof, are sent to the primary CBCE(s) and then applied on the primary component(s) thereof. The copy components and copy CBCEs are no longer synchronized respective of their primary counterparts. External references to the components brought from copy mode which are not part of the CBCE 120 and 130, for example, the DNS addresses of a site on an external DNS server, are optionally updated (automatically or manually). The copy CBCE 130 and/or its respective components are optionally turned off and/or destroyed. This failback operation therefore copies from the copy CBCE and components thereof all, or essentially all, of the changes made in the copy CBCE and components thereof, to the primary CBCE and components thereof prior to reactivating, or otherwise resuming, the operation of the primary CBCE.

The embodiment disclosed herein can be implemented as hardware, firmware, software or any combination thereof, including but not limited to software products. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware, physical or virtual, such as a processing unit ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit and/or display unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing failovers for a primary cloud-based computing environment (CBCE) residing in a first cloud environment, comprising:
   automatically gathering information with respect to the primary CBCE, the information comprising data of and configurations for each of a plurality of components of the primary CBCE;
   storing the gathered information in a storage space that is not employed to provide a service in the primary CBCE;
   updating the stored information based on at least one change with respect to the primary CBCE;
   determining, based on at least one status received from the primary CBCE, whether a failover is required for the primary CBCE; and
   initiating a reconstruction of the primary CBCE in a second cloud environment, when it is determined that a failover is required for the primary CBCE, wherein the reconstruction of the primary CBCE is based on the stored information.

2. The method of claim 1, wherein a failover is required for the primary CBCE when at least one element of the primary CBCE in the first cloud environment has failed.

3. The method of claim 1, wherein each of the first cloud environment and the second cloud environment includes a plurality of cloud computing infrastructures.

4. The method of claim 1, wherein the primary CBCE is configured to execute at least one cloud-based application.

5. The method of claim 4, further comprising:
   replicating at least a portion of the primary CBCE to create a reconstructed CBCE, wherein the reconstructed CBCE is configured to execute the at least one cloud-based application.

6. The method of claim 5, wherein the gathered information includes all components of the primary CBCE and a configuration of the primary CBCE, wherein the reconstructed CBCE includes the components and the configuration of the primary CBCE.

7. The method of claim 5, further comprising:
   redirecting traffic from the primary CBCE to the reconstructed CBCE.

8. The method of claim 1, further comprising:
   selecting the second cloud environment for reconstruction of the primary CBCE.

9. The method of claim 1, further comprising:
   releasing the primary CBCE from either the first cloud environment or the second cloud environment, when the reconstruction of the primary CBCE is completed.

10. A non-transitory computer readable medium having stored thereon instructions for causing a processing circuitry to perform a process, the process comprising:
    automatically gathering information with respect to a primary cloud-based computing environment (CBCE), the information comprising data of and configurations for each of a plurality of components of the primary CBCE;
    storing the gathered information in a storage space that is not employed to provide a service in the primary CBCE;
    updating the stored information based on at least one change with respect to the primary CBCE;
    determining, based on at least one status received from the primary CBCE, whether a failover is required for the primary CBCE; and
    initiating a reconstruction of the primary CBCE in a second cloud environment, when it is determined that a failover is required for the primary CBCE, wherein the reconstruction of the primary CBCE is based on the stored information.

11. A system for providing failovers for a primary cloud-based computing environment (CBCE) residing in a first cloud environment, comprising:
    a processing circuitry; and
    a memory, the memory containing instructions that, when executed by the processing circuitry, configure the system to:
    gather information with respect to the primary CBCE, the information comprising data of and configurations for each of a plurality of components of the primary CBCE;
    store the gathered information in a storage space that is not employed to provide a service in the primary CBCE;
    update the gathered information based on at least one change with respect to the primary CBCE;
    determine, based on at least one status received from the primary CBCE, whether a failover is required for the primary CBCE; and
    initiate a reconstruction of the primary CBCE in a second cloud environment, when it is determined that a failover is required for the primary CBCE, wherein the reconstruction of the primary CBCE is based on the stored information.

12. The system of claim 11, wherein a failover is required for the primary CBCE when at least one element of the primary CBCE in the first cloud environment has failed.

13. The system of claim 11, wherein each of the first cloud environment and the second cloud environment includes a plurality of cloud computing infrastructures.

14. The system of claim 11, wherein the primary CBCE is configured to execute at least one cloud-based application.

15. The system of claim 14, wherein the system is further configured to:
    replicate at least a portion of the primary CBCE to create a reconstructed CBCE, wherein the reconstructed CBCE is configured to execute the at least one cloud-based application.

16. The system of claim 15, wherein the gathered information includes all components of the primary CBCE and a configuration of the primary CBCE, wherein the reconstructed CBCE includes the components and the configuration of the primary CBCE.

17. The system of claim 15, wherein the system is further configured to:
  redirect traffic from the primary CBCE to the reconstructed CBCE.

18. The system of claim 11, wherein the system is further configured to:
  select the second cloud environment for reconstruction of the primary CBCE.

19. The system of claim 11, wherein the system is further configured:
  release the primary CBCE from either the first cloud environment or the second cloud environment, when the reconstruction of the primary CBCE is completed.

* * * * *